March 19, 1963  R. H. HAHN ET AL  3,082,394
COUPLING
Filed Nov. 12, 1959   3 Sheets-Sheet 3
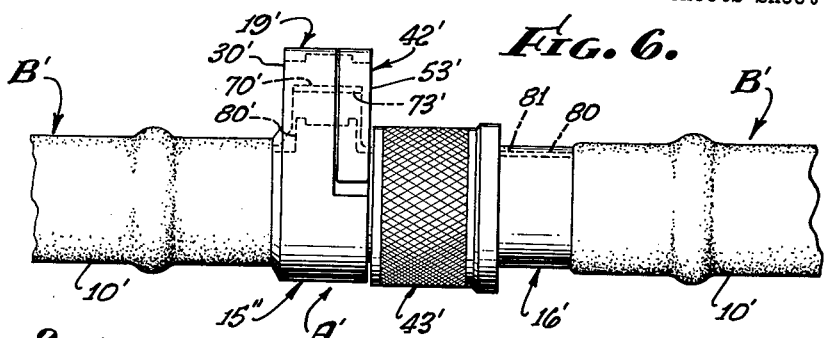
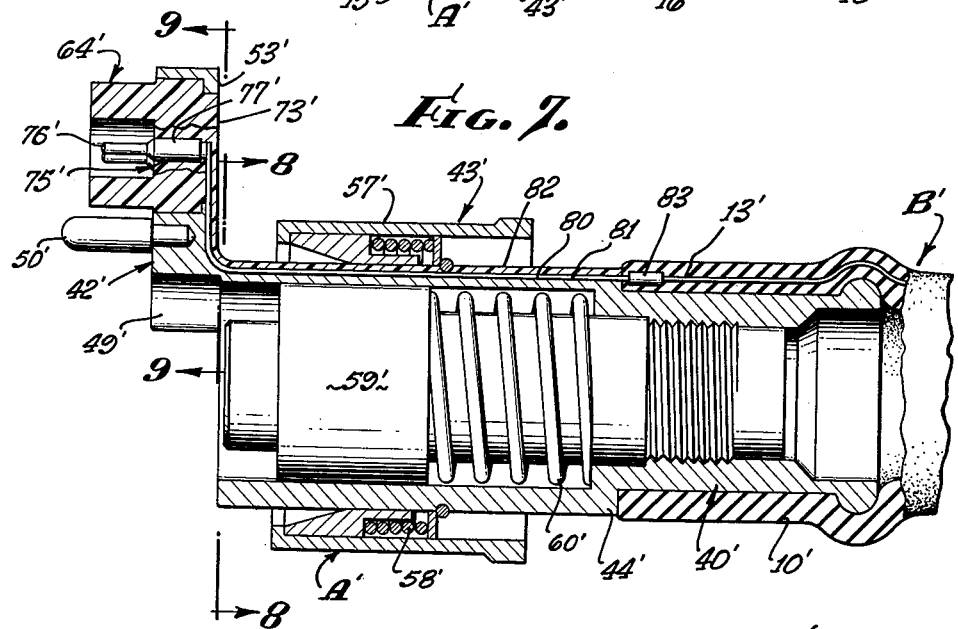
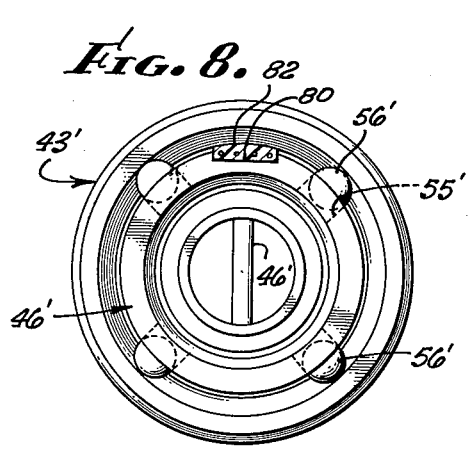
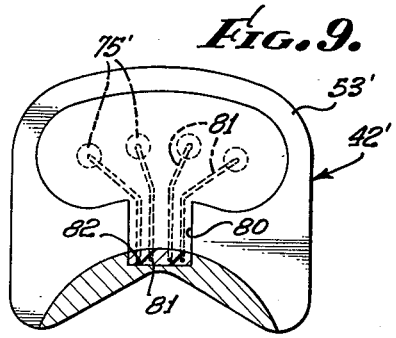
RICHARD H. HAHN
HOWARD V. FRENCH
INVENTORS
BY George A. Maxwell
AGENT

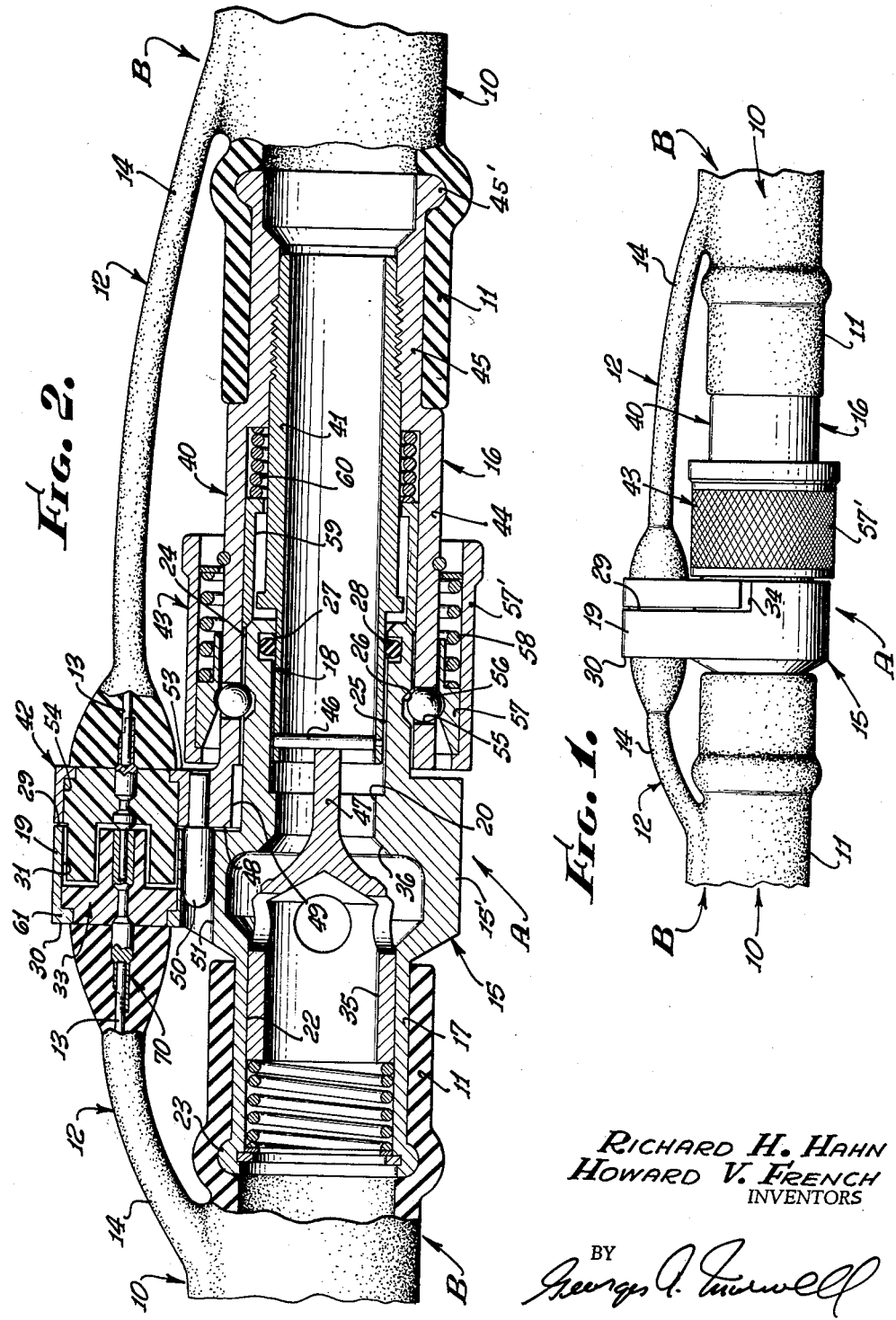

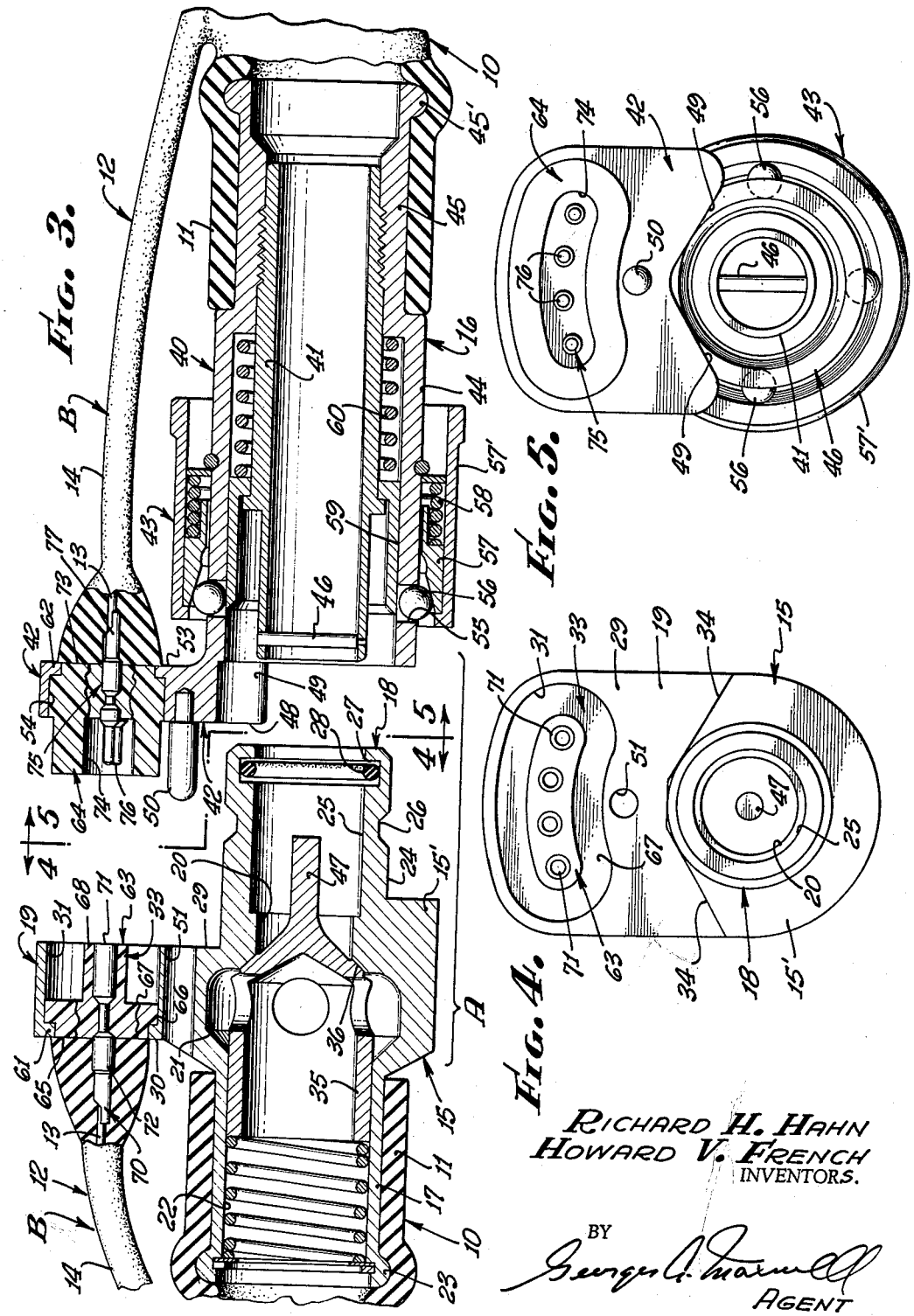

United States Patent Office 3,082,394
Patented Mar. 19, 1963

3,082,394
COUPLING
Richard H. Hahn, Burbank, and Howard V. French, Sepulveda, Calif. (both % Airborne Research & Development Corp., 7530 San Fernando Road, Sun Valley, Calif.)
Filed Nov. 12, 1959, Ser. No. 852,359
8 Claims. (Cl. 339—16)

This invention has to do with a quick disconnect coupling and is more particularly concerned with a quick disconnect coupling adapted to make and break connection between sections of a flexible fluid or gas conducting hose, and between sections of an electric loom having a plurality of electrical lines and extending parallel with said hose.

The coupling that we provide, while suitable for use in many situations, is primarily intended for use in aircraft and more particularly in connection with a combination oxygen supply hose and electrical loom adapted to supply oxygen to a pilot and to connect electrical or electronic components carried by the aircraft and related components carried on or by the person of the pilot.

In the past, it has been common practice to provide separate, quick disconnect couplers between the sections of the oxygen supply hose and the sections of the electrical loom extending to the pilot and so that the pilot can advantageously and quickly connect or disconnect the equipment he carries on his person with or from its related equipment carried in the aircraft.

Due to the limited quarters and due to the considerable amount of surrounding structure upon which the loom might foul, it was originally the custom to tape the loom to the exterior of the oxygen hose and thereby reduce the possibilities of the loom becoming fouled. In recent times, and in an effort to further reduce the tendency for the loom to become fouled and to protect it, the loom has been formed in the wall of the oxygen hose, which is formed of rubber, or the like.

The ends of the looms, formed integrally with the hoses to which they are related, have leads or pig tails adjacent each end of each section of hose, which leads are connected with suitable electrical couplers, such as simple plugs and sockets.

While the above construction has greatly reduced the possibility of the looms becoming fouled, by only having short portions thereof exposed, as at opposing ends of each pair of hose sections, it has not entirely eliminated the possibility of fouling and has not eliminated the problems which arise from repeated flexing and bending of the leads or pig tails at the ends of the loom.

It has been found that in combination, oxygen hose and electrical loom structures such as referred to above, the point of failure generally occurs where the leads from the loom connect with the electrical couplers and that such failure is due to the inevitable and repeated flexing of the leads at these points during the normal use of the structures.

An object of the present invention is to provide a novel quick disconnect coupler adapted to connect opposing ends of sections of a combination oxygen hose and electrical loom.

Another object of our invention is to provide a structure of the character referred to having a male section adapted to connect with an end of a section of a combination hose and loom, and a female section adapted to connect with the opposing end of another section of the combined hose and loom.

A further object of this invention is to provide a coupling of the character referred to wherein one of the sections thereof carries releasable locking means to engage elements of the other section, which means includes a longitudinally shiftable actuating sleeve about the exterior of the said one section and adapted to be engaged by the hand of the operator and/or connected with a suitable automatic releasing means, as circumstances require.

Another object of our invention is to provide a structure of the character referred to wherein accessibility and operation of the actuating sleeve is not impeded by the loom and wherein the loom and electrical parts and/or portions of the structure are independent of and are in no way affected by operation of the said locking means.

An object of our invention is to provide one embodiment wherein the end portions of the loom related to the section carrying the locking means bridges the actuating sleeve and a secondary embodiment wherein the end portion of the loom extends through the actuating sleeve.

It is another object of the present invention to provide a novel orienting means to assure proper alignment and registering of the several interengaging parts of the male and female sections and such that visual reference to the coupling assembly is not necessary to positively connect or disconnect.

The various objects and features of our invention will be fully understood from the following detailed description of typical preferred forms and applications of our invention, throughout which description reference is made to the accompanying drawings, in which:

FIG. 1 is an elevational view of one form of the invention that we provide.

FIG. 2 is an enlarged longitudinal sectional view of the structure shown in FIG. 1.

FIG. 3 is a view similar to FIG. 2 and showing the sections of the coupling separated.

FIGS. 4 and 5 of the drawings are elevational views of the opposing ends of the sections of the coupling shown in FIGS. 1 and 2 and taken as indicated by lines 4—4 and 5—5 on FIG. 2.

FIG. 6 is an elevational view of a second form of our invention.

FIG. 7 is a longitudinal sectional view of a section of the coupling shown in FIG. 6.

FIG. 8 is a view taken as indicated by line 8—8 on FIG. 7.

FIG. 9 is a sectional view taken as indicated by line 9—9 on FIG. 7.

The coupling A provided by the present invention is adapted to releasably connect opposing ends of a sectional, combination oxygen hose and electrical loom structure B.

Each section of the structure B includes a simple rubber hose 10 having an annular wall 11, and a loom 12 including a plurality of electric lines 13, extending longitudinally of the hose and imbedded in the wall 11 thereof.

In the form of the invention shown in FIGS. 1 through 5 of the drawings, the loom 12 in each section of the structure B has an end portion 14 which projects from the wall 11 of the hose at a point spaced longitudinally from the end of the hose which is engaged with a section of the coupling A. The lines 13 in the end portions 14 of the loom 12 are suitably bundled and jacketed with a rubber or rubber-like mass which is the same as that which establishes the side wall of the hose and which is formed integrally therewith. The free end portions 14 of the looms 12 continue longitudinally beyond the related ends of the hose sections and connect with the electrical connections of the coupling sections and as will hereinafter be described.

The coupling A illustrated in FIGS. 1 through 5 of the drawings includes a male section 15 and a female section 16.

The male section 15 of the coupling A is a unitary structure and includes generally, a central body portion 15′, a hose engaging nipple 17, a male member 18 and a block or head 19.

The central body portion 15′ of the male section 15 is substantially cylindrical in cross-section having inner and outer ends, a central flow passage 20 and an enlarged flow chamber 21 concentric with the flow passage and arranged to occur in the outer end portion of the body.

The nipple 17 is a simple, straight, tubular part concentric with the body and projects longitudinally from the outer end of the body. The nipple has a straight cylindrical bore 22 communicating with the flow chamber in the body and is provided at its outer terminal end with a radially outwardly projecting, rounded bead 23 to cooperate with the hose section related thereto and to prevent accidental disengagement of the hose and coupling section. The end portion of the hose section is slidably engaged over the nipple and is cemented or bonded thereto.

The male member is a substantially straight, tubular part formed integrally with the body 15 to project axially from the inner end of the body. The member 18 has a cylindrical outer wall 24 and a cylindrical bore 25 concentric with and communicating with the flow passage 20 in the body.

The outer wall of the member 18 is provided with an annular radially outwardly opening groove 26 adapted to cooperatively receive locking members carried by the female section of the coupling and is provided with a radially inwardly opening annular groove 27 in the bore to carry a sealing ring 28 to seal with a part of the female section, as will hereinafter be described.

The head 19 of the section 15 of the coupling A is a simple, laterally projecting, block-like member formed integrally on the body 15′, and, as shown, projects radially upwardly therefrom. The head or block has flat, radially disposed inner and outer faces 29 and 30.

The outer face of the block 19 is in substantially the same plane as the outer end of the body, while the inner face of the block is spaced longitudinally outwardly from the inner end of the body.

The block 19 is provided with an opening 31 which extends longitudinally therethrough and in which an element of an electrical connector 33 is mounted.

The portion of the body which projects inwardly from the inner face 29 of the block 19 is provided with a pair of upwardly convergent flats 34 about its upper half to cooperatively receive parts on the female section and to assure proper orientation of the sections of the coupling, as will be apparent from the following.

In addition to the foregoing, the male section 15 of the coupling A includes a longitudinally shiftable, spring-loaded valve member 35 slidably engaged in the bore 22 in the nipple 17. The valve member has a ported portion which projects into the flow chamber in the body and which is shifted into and out of engagement with an annular seat 36 at the outer end of the flow passage 20.

When the coupling A is broken, the valve member shifts forwardly to engage on the seat 36 and shut off flow through the male section. When the coupling A is made up, a part on the female section 16 engages the valve member and urges it away from engagement on the seat 36 and so the fluid is free to flow through the male section and thence into and through the female section.

The valve means in the male section illustrated in the drawings and briefly described above does not affect the novelty of the present invention and is only a means normally associated with the type of coupling herein concerned with. Accordingly, we will not burden this application with further unnecessary detailed description of the said valve.

The female section 16 of the coupling A includes generally, a body 40, a flow tube 41 carried by the body, a head 42 on the body and manually operable, releasable locking means 43 carried by the body and adapted to engage the male section 15.

The body 40 is an elongate tubular member having an elongate inner portion 44 and an elongate outer portion 45 of reduced diameter and establishing a hose engaging nipple. The outer or nipple portion 45 of the female section is provided with a radially outwardly projecting head 45′ at its outer end and is adapted to cooperatively engage in the end of the other section of the hose 11 in the same manner as the nipple portion of the male section engages in its related section of the hose and as illustrated in the drawings.

The flow tube 41 is a simple, substantially straight, tubular member having an outer end threadedly engaged in the outer, reduced portion 45 of the body and having an inner end portion projecting freely into the inner portion 44 of the body, concentric therewith and terminating in substantially the same plane with the inner terminal end of the body 40.

The flow tube is of substantially less diametric extent than the inside diameter of the inner section 44 of the body 40 and defines an annulus to receive the male member 18 of the section 15 of the coupling.

The inside diameter of the inner portion 44 of the body 40 is substantially the same as the outside diameter of the inner end of the male member 18 of the male section and the outside diameter of the flow tube is substantially the same as the inside diameter of the said male member 18.

With this relationship of parts, it will be apparent that when the sections of the coupling are engaged, the male member 18 slidably enters the body of the female section and the flow tube 41 carried by the female section slidably enters the male member.

It will be further apparent that when the flow tube is engaged in the male member, the sealing ring 28 carried by the male member seals about the flow tube.

The flow tube 41 is shown provided with a pin 46 extending transverse its inner end, which pin is adapted to engage an inwardly projecting stem 47 on the valve member 35, referred to above. With this construction, it will be apparent that when the flow tube is urged into the male member, the pin 46 engages the stem 47 and urges the valve member open.

The head 42 on the female section is a simple block-like part formed integrally with the body and projects inwardly and upwardly from the inner terminal end of the body.

The head 42 has a flat, radially disposed inner face 48 which opposes the inner face 29 on the head 19 of the male section 15 and has a bottom side with a pair of upwardly convergent flats 49, which flats slidably engage and oppose the flats 34 on the forward portion of the body of the male section, when the coupling is made up.

With the above relationship of parts, it will be apparent that the flats 34 on the body of the male section and the flats 49 on the head of the female section cooperate to establish an orienting means and to assure proper relative positioning and alignment of the heads 19 and 42 on the said sections, when the coupling is made up and prevent relative rotation of the parts.

In the preferred carrying out of the invention and as illustrated in the drawings, the orienting means established by the flats 34 and 49 is supplemented by a guide pin 50 carried by the head 42 to project inwardly from the inner face thereof and a guide pin receiving opening 51 in the head 19 on the female section.

The head 42 has a flat, radially disposed outer surface 53 and an opening 54 which extends longitudinally therethrough and in which an element of the electrical connector 33 is mounted.

The manually operable, releasable locking means 43 includes a plurality of circumferentially spaced radial openings 55 in the inner end portion of the body 40 of the female section, a ball member 56 engages in each opening, an annular wedge ring 57 slidably engaged about the body, a compression spring 58 normally yieldingly urging the ring longitudinally inwardly to engage and urge the ball members radially inwardly and into engagement in the radial groove 26 in the male member 18 and an annular actuating sleeve 57' slidably engaged about the ring 57 and the body 40 to carry the spring 58 and adapted to facilitate urging the ring 57 rearwardly against the resistance of the spring and out of engagement with the ball members, whereupon the said ball members are free to shift radially outward in the openings 55 and out of engagement in the groove 26, and thereby allow for free longitudinal shifting of the male member 18 relative to the body of the female section and braking of the coupling.

In addition to the foregoing, the means 43 is further provided with an elongate retainer sleeve 59 arranged to occur within the annulus between the inner section 44 of the body 40 and the flow tube 41, and a compression spring 60 in said annulus and adapted to normally yieldingly urge the sleeve 59 longitudinally inwardly.

When the male member 18 is engaged in the body 40 of the female section, its inner end engages the sleeve 59 and urges the sleeve longitudinally outwardly in the female section and against the spring 60.

When the balls are released to shift radially outwardly and the male member is withdrawn from engagement in the female section, the sleeve 59 follows the male member to a point where it overlies the openings 55 and holds the balls 56 out and the ring 57 and actuating sleeve 57' in their actuated position, as clearly illustrated in FIG. 3 of the drawings.

It is extremely important to note that the wedge ring 57 is slidably engaged in the actuating sleeve 57' and that the spring 58 is engaged between the ring and the sleeve to normally urge the ring longitudinally inwardly in the sleeve. With this relationship of parts and when the coupling is being made up and the sleeve 57' is engaged in one's hand and is urged longitudinally inwardly, the ring 57 is cushioned by the spring and is not manually driven inwardly in a manner that will result in binding and gauling the ball members.

With this instant relationship of parts, when the coupling is being made as set forth above, the sleeve stops against the head of the female coupling section and the ring 57 is spring loaded. When the coupling sections are properly interengaged, the spring loaded ring urges the ball members into engagement with the male member of the male section of the coupling.

The openings 31 and 54 in the heads 19 and 42 of the male and female sections of the coupling are of the same cross sectional configuration and register with each other when the coupling is made up. The outer open ends of the openings 31 and 54 are provided with inwardly projecting stop flanges 61 and 62, respectively.

The electrical connector 33 that we provide is shown as including, a socket carrier 63 engaged in the opening 31 in the head 19 of the male section and a jack carrier 64 engaged in the opening 54 in the head 42 of the female section 16.

The carriers 63 and 64 are formed of a suitable dielectric material and are shaped so as to cooperatively engage in their related openings and to seat against the stop flanges 61 and 62.

The carrier 63 is of limited longitudinal extent and has a flat outer end surface 65 which occurs flush with the outer surface 30 of the head 19, a side surface 66 about its perimeter which engages the wall of the opening 31, a flat radially disposed inner surface 67 which stops or terminates within the opening, that is, it terminates longitudinally outward of the inner face 29 of the head, and an inwardly projecting boss 68 projecting longitudinally inwardly from the inner face 29.

A plurality of elongate, longitudinally disposed socket elements 70 are carried by the carrier 63. Each socket element 70 has a longitudinally inwardly opening inner portion 71 arranged to occur in the boss 63 and an outwardly opening outer portion 72 projecting longitudinally from the outer surface 65 of the carrier.

The inner portion 71 of each member 70 is adapted to receive a jack element carried by the carrier 64, as will hereinafter be described, and the outer portion 72 of each member 70 is adapted to receive and/or connect with one of the lines 13 of the section of the loom B.

In practice, and as illustrated in the drawings, the rubber or rubber-like jacket about the end portion 14 of the section of the loom B now under consideration, is formed about the outer portions 72 of the members 70 and is bonded to the outer surfaces 30 and 65 of the head 19 and carrier 63.

The carrier 64 is an elongate member having a flat outer surface 73 which occurs flush with the outer surface 53 of the head 42 on the female section, an outer portion cooperatively engaged in the opening 54 in the head and an inner portion projecting longitudinally inwardly from the inner surface 48 of the head and adapted to slidably enter the opening 31 in the head 19 of the male section and to oppose the inner surface 67 of the carrier 63 when the coupling is made up. The carrier 64 is further provided with an inwardly opening recess 74 entering its inner end and adapted to slidably receive the boss 68 on the carrier 63 when the coupling is made up.

A plurality of elongate, longitudinally disposed jack elements 75 are carried by the carrier 64. Each jack element 75 has an inner pin-like portion 76 which projects longitudinally inwardly into the recess 74 and is adapted to slidably enter one of the socket elements 70 in the carrier 63, and an outer portion 77 projecting longitudinally outwardly from the outer surface 73 of the carrier and adapted to receive and/or connect with one of the lines 13 of the section of the loom B related to the female section of the coupling.

In practice, the rubber or rubber-like jacket about the end portion 14 of the section of the loom B related to the female section is formed about the outer portions 77 of the members 75 and is bonded to the outer surfaces 53 and 73 of the head 42 and carrier 64.

It will be apparent that as a result of the interengaged relationship of the carriers 63 and 64 the inner portions 71 and 76 of the elements 70 and 75 are protected at all times and further, that when the coupling is made up, a suitable labyrinth type of seal is established to prevent the entry of foreign matter between the carriers and which might cause a short circuit between the several elements.

With the structure set forth above, it will be apparent that the electrical connecting elements are in fixed position with respect to their related coupling sections and that when the coupling is made up or broken, the said elements and the lines 13 connected therewith are not flexed or otherwise manipulated in a manner which could cause fatigue or failure.

It will be further apparent that the end portion 14 of the loom related to the female section 16 of the coupling bridges and is clear of the longitudinally shiftable actuating sleeve 57' of the lock means 43, with the result that when the said actuating sleeve 57' is engaged and/or shifted, as when the coupling is made up or broken, the said end portion 14 of the loom and the other parts and/or elements of the electrical setup related thereto are in no way affected.

With our new construction, it will be apparent that the operator, or pilot, when making connection with the oxygen supply system and electrical system of the aircraft need only concern himself with one simple operation, that is, urging the opposing sections of the coupling together. It will be further apparent that when the pilot wishes to break the connections, he need only engage the male section in one hand and the actuating sleeve 57' on the female section in his other hand and pull the coupling sections apart.

In the form of the invention illustrated in FIGS. 6 through 9 of the drawings, the male section 15" of the coupling A' is substantially the same as in the first form of the invention, and the female section 16' is substantially the same as the female section in the first form of the invention with the exception that the inner portion 44' of the body 40' and the outer surface 53' of the head 42' of the female section and the outer surface 30' of the head 19' of the male section are provided with channels 80 and 80' in which electrical leads 81, connected with the elements 75' and 70' are arranged to extend from the said elements, radially inwardly and then longitudinally outwardly to the end of the combined hose and loom structure B', where they are suitably connected with the electrical lines 13'.

In this form of the invention, and considering only the female section 16', the channel 80 is filled with a body 82 of a suitable dielectric material and in which the leads 81 are suitably bonded and supported. The said body of material is suitably dressed so as to fair with the exterior surfaces of the body and head and so as to not establish projections, or the like, which might otherwise interfere with the operation of the construction.

In this second form of the invention, the outer portions 77' of the jack elements 75' do not project from the outer surface 73' of the carrier 64', but terminate within the carrier, as clearly illustrated in FIGS. 7 of the drawings.

The body 82 of the dielectric material in the channel 80 is preferably the same material as the carrier 64' and is formed integrally therewith.

In this form of the invention, the balls and ball receiving openings 56' and 55' of the means 43' are arranged circumferentially of the body so as to clear the channel 80 and leads 81, as clearly illustrated in FIG. 8 of the drawings.

In the form of the invention now under consideration, the lines 13' in the combined hose and loom structure B' extend to the end of the hose 10' where they are provided with suitable sleeve couplers 83 to receive the ends of the leads 81.

In this second form of the invention, it will be apparent that the leads 81 are completely enclosed and extend through the actuating sleeve 57' of the locking means 43' in such a manner that there is no possibility of interference therebetween when the structure is operated.

It is to be understood that, in practice, the male section 15" of the coupling A' that we provide is provided with a lead conducting channel 80' in substantially the same manner as is the female section and in which case the end portion 14 of the loom, projecting from the hose, shown in the first form of the invention, is eliminated.

Since such a modification is obvious and apparent from the foregoing, further illustration and detailed description of such a modification will be dispensed with as being unnecessary.

Having described only typical preferred forms and applications of our invention, we do not wish to be limited or restricted to the specific details herein set forth, but wish to reserve to ourselves any modifications or variations that may appear to those skilled in the art and fall within the scope of the following claims.

Having described our invention, we claim:

1. A combination fluid and electrical quick disconnect coupling of the character referred to including, a male section having an elongate tubular body with inner and outer ends, an elongate tubular hose-engaging nipple concentric with and extending from the outer end of the body, an elongate tubular male member concentric with and extending longitudinally from the inner end of the body and a laterally projecting head on the body having a flat axially disposed inner face and an opening extending longitudinally therethrough, a female section having an elongate tubular body with inner and outer ends, an elongate tubular hose-engaging nipple concentric with and extending from the outer end of the body and a laterally projecting head having a flat axially disposed inner face and an opening extending longitudinally therethrough, said male and female sections arranged in axial alignment with their inner ends opposed to each other and with the male member engaged in the body of the female section and with the inner faces on the heads abutting each other, manually operable locking means releasably securing the sections together and including, radially shiftable members carried by the body of the female section and engaged with the male member and a longitudinally shiftable actuating sleeve surrounding the body of the female section longitudinally outwardly of the head thereof and engaging the said shiftable members to normally maintain them in engagement with the male member and to allow for free radial outward shifting of the said members when the sleeve is shifted longitudinally, said body of the female section having a radially outwardly opening longitudinal groove extending through the actuating sleeve and cooperatively receiving a section of an electrical loom, an electrical coupler including carriers of dielectric material in the openings in the heads, inwardly opening socket elements carried by one carrier and connected with the lines of a section of an electrical loom at the rear of the head, inwardly projecting jack elements carried by the other carrier to register with and slidably enter the socket elements in the first mentioned carrier and connected with the lines of another section of the electrical loom.

2. A combination fluid and electrical quick disconnect coupling of the character referred to including, a male section having an elongate tubular body with inner and outer ends, an elongate tubular hose-engaging nipple concentric with and extending from the outer end of the body, an elongate tubular male member concentric with and extending longitudinally from the inner end of the body and a laterally projecting head on the body having a flat axially disposed inner face and an opening extending longitudinally therethrough, a female section having an elongate tubular body with inner and outer ends, an elongate tubular hose-engaging nipple concentric with and extending from the outer end of the body and a laterally projecting head having a flat axially disposed inner face and an opening extending longitudinally therethrough, said male and female sections arranged in axial alignment with their inner ends opposed to each other and with the male member engaged in the body of the female section and with the inner faces on the heads abutting each other, manually operable locking means releasably securing the sections together and including, radially shiftable members carried by the body of the female section and engaged with the male member and a longitudinally shiftable actuating sleeve surrounding the body of the female section longitudinally outwardly of the head thereof and normally engaging the shiftable members to maintain them in engagement with the male member and adapted to be shifted out of engagement with said members to allow for free radial outward shifting of said members in the female section and away from the male member, said body of the female section having a radially outwardly opening longitudinal groove extending through the actuating sleeve and cooperatively receiving a section of an electrical loom, an electrical coupler including carriers of dielectric material in the openings in the heads, inwardly opening sockets elements carried by one carrier and connected with the lines of a section of an electrical loom at the rear of the head, inwardly projecting jack elements carried by the other carrier to register with and slidably enter the socket elements in the first mentioned carrier and connected with the lines of another section of the electrical loom, said groove in the female section being filled with a body of dielectric material in which the said lines of the loom are carried, and orienting means including a longitudinally inwardly projecting pin on the head of one section and engaged in an opening in the head of the other section.

3. A combination fluid and electrical quick disconnect coupling of the character referred to including, a male section having an elongate tubular body with inner and outer ends, an elongate tubular hose-engaging nipple concentric with and extending from the outer end of the body, an elongate tubular male member concentric with and extending longitudinally from the inner end of the body and a laterally projecting head on the body having a flat axially disposed inner face, and an opening extending longitudinally therethrough, a female section having an elongate tubular body with inner and outer ends, an elongate tubular hose-engaging nipple concentric with and extending from the outer end of the body and a laterally projecting head having a flat axially disposed inner face and an opening extending longitudinally therethrough, said male and female sections arranged in axial alignment with their inner ends opposed to each other and with the male member engaged in the body of the female section and with the inner faces on the heads abutting each other, manually operable locking means releasably securing the sections together and including, radially shiftable members carried by the body of the female section and engaged with the male member of the male section and a longitudinally shiftable actuating sleeve surrounding the body of the female section longitudinally outwardly of the head thereof and operatively related to the said shiftable members to normally maintain them in engagement with the male member and shiftable out of engagement with said members to allow said members to shift radially outwardly and away from said male member, said female section having a groove extending longitudinally of the body and radially in the head to communicate with the opening in the head and cooperatively receiving a section of an electrical loom, an electrical coupler including carriers of dielectric material in the openings in the heads, inwardly opening socket elements carried by one carrier and connected with lines of a section of an electrical loom at the rear of the head, inwardly projecting jack elements carried by the other carrier to register with and slidably enter the socket elements in the first mentioned carrier and connected with the lines of another section of the electrical loom, said nipple and head of the male section having a radially and longitudinally outwardly opening groove cooperatively receiving the section of the electrical loom related thereto.

4. A combination fluid and electrical quick disconnect coupling of the character referred to including, a male section having an elongate tubular body with inner and outer ends, an elongate tubular hose-engaging nipple concentric with and extending from the outer end of the body, an elongate tubular male member concentric with and extending longitudinally from the inner end of the body and a laterally projecting head on the body spaced outwardly from the inner end thereof and having a flat axially disposed inner face and an opening extending longitudinally therethrough, a female section having an elongate tubular body with inner and outer ends, an elongate tubular hose-engaging nipple concentric with and extending from the outer end of the body and an inwardly extending, laterally projecting head having a flat axially disposed inner face and an opening extending longitudinally therethrough, said male and female sections arranged in axial alignment with their inner ends opposed to each other and with the male member engaged in the body of the female section and with the inner faces on the heads abutting each other, manually operable locking means releasably securing the sections together and including, radially shiftable members carried by the body of the female section and engaged with the male member and a longitudinally shiftable actuating sleeve surrounding the body of the female section longitudinally outwardly of the head thereof and operatively related to the said shiftable members to normally hold them in engagement with the male member and operable to allow for free shifting of said members from engagement with said male member, an electrical coupler including carriers of dielectric material in the openings in the heads, inwardly opening socket elements carried by one carrier and connected with lines of a section of an electrical loom at the rear of the head, inwardly projecting jack elements carried by the other carrier to register with and slidably enter the socket elements in the first mentioned carrier and connected with the lines of another section of the electrical loom, and orienting means including a pair of angularly related flats on the body of the male section forward of the head thereon and a pair of angularly related flats on the head of the female section to oppose and slidably engage the flats on the male section when the sections are engaged.

5. A combination fluid and electrical quick disconnect coupling of the character referred to including, a male section having an elongate tubular body with inner and outer ends, an elongate tubular hose-engaging nipple concentric with and extending from the outer end of the body, an elongate tubular male member concentric with and extending longitudinally from the inner end of the body and a laterally projecting head on the body spaced outwardly from the inner end thereof and having a flat axially disposed inner face and an opening extending longitudinally therethrough, a female section having an elongate tubular body with inner and outer ends, an elongate tubular hose-engaging nipple concentric with and extending from the outer end of the body and an inwardly extending, laterally projecting head having a flat axially disposed inner face and an opening extending longitudinally therethrough, said male and female sections arranged in axial alignment with their inner ends opposed to each other and with the male member engaged in the body of the female section and with the inner faces on the heads abutting each other, manually operable locking means releasably securing the sections together and including, radially shiftable members carried by the body of the female section and engaged in a radially outwardly opening groove in the male member of the male section and a longitudinally shiftable actuating sleeve surrounding the body of the female section longitudinally outwardly of the head thereof and engaging the said shiftable members to normally maintain them in engagement with the male member and adapted to be shifted to allow for free radial outward shifting of the members away from the male member, said body of the female section having a radially outwardly opening longitudinal groove, extending through the actuating sleeve and cooperatively receiving a section of an electrical loom, an electrical coupler including carriers of dielectric material in the openings in the heads, inwardly opening socket elements carried by one carrier and connected with lines of a section of an electrical loom at the rear of the head, inwardly projecting jack elements carried by the other carrier to register with and slidably enter the socket elements, in the first mentioned carrier and connected with the lines of another section of the electrical loom, and orienting means including a pair of angularly related flats on the body of the male section forward of the head thereon and a pair of angularly related flats on the head of the female section to oppose and slidably engage the flats on the male section when the sections are engaged, said groove in the female section being filled with a body of dielectric material in which the said lines of the loom are carried, and a second orienting means including a longitudinally inwardly projecting pin on the head of one section and engaged in an opening in the head of the other section.

6. A combination fluid and electrical quick disconnect coupling of the character referred to including, a male section having an elongate tubular body with inner and outer ends, an elongate tubular hose-engaging nipple concentric with and extending from the outer end of the body, an elongate tubular male member concentric with and extending longitudinally from the inner end of the body and a laterally projecting head on the body spaced outwardly from the inner end thereof and having a flat axially disposed inner face and an opening extending longitudinally therethrough, a female section having an elongate tubular body with inner and outer ends, an elongate tubular hose-engaging nipple concentric with and extending from the outer end of the body and an inwardly extending, laterally projecting head having a flat axially disposed inner face and an opening extending longitudinally therethrough, said male and female sections arranged in axial alignment with their inner ends opposed to each other and with the male member engaged in the body of the female section and with the inner faces on the heads abutting each other, manually operable locking means releasably securing the sections together and including, radially shiftable ball members carried by the body of the female section and engaged in a radially outwardly opening groove in the male member and a longitudinally shiftable actuating sleeve surrounding the body of the female section longitudinally outwardly of the head thereof and engaging the said shiftable members to normally maintain them in engagement with the male member, said female section having a groove extending longitudinally of the body and radially in the head to communicate with the opening in the head and cooperatively receiving a section of an electrical loom, an electrical coupler including carriers of dielectric material in the openings in the heads, one carrier having an inwardly projecting boss with inwardly opening socket elements and connected with lines of a section of an electrical loom at the rear of the head, the other carrier having an inwardly opening recess to slidably receive the boss and inwardly projecting jack elements in the recess to register with and slidably enter the socket elements in the first mentioned carrier and connected with the lines of another section of the electrical loom.

7. A combination fluid and electrical quick disconnect coupling of the character referred to including, a male section having an elongate tubular body with inner and outer ends, an elongate tubular hose-engaging nipple concentric with and extending from the outer end of the body, an elongate tubular male member concentric with and extending longitudinally from the inner end of the body and a laterally projecting head on the body spaced outwardly from the inner end thereof, and having a flat axially disposed inner face and an opening extending longitudinally therethrough, a female section having an elongate tubular body with inner and outer ends, an elongate tubular hose-engaging nipple concentric with and extending from the outer end of the body and an inwardly extending, laterally projecting head having a flat axially disposed inner face and an opening extending longitudinally therethrough, said male and female sections arranged in axial alignment with their inner ends opposed to each other and with the male section engaged in the body of the female section and with the inner faces on the heads abutting each other, manually operable locking means releasably securing the sections together and including, radially shiftable ball members carried by the body of the female section and normally engaged in an annular groove in the male member and a longitudinally shiftable actuating sleeve surrounding the body of the female section longitudinally outwardly of the head thereof and having a cam part operatively related to the said ball members to shift them radially into engagement with the male member, said female section having a groove extending longitudinally of the body and radially in the head to communicate with the opening in the head and cooperatively receiving one of two sections of an electrical loom, said male section having a groove extending longitudinally of the nipple thereof and in the head to communicate with the opening in the head and cooperatively receiving the other section of the loom, an electrical coupler including carriers of dielectric material in the openings in the heads, one carrier having an inwardly projecting boss with inwardly opening socket elements and connected with lines of a section of an electrical loom at the rear of the head, the other carrier having an inwardly opening recess to slidably receive the boss and inwardly projecting jack elements in the recess to register with and slidably enter the socket elements in the first mentioned carrier and connected with the lines of the other section of the electrical loom, and orienting means including a pair of angularly related flats on the body of the male section forward of the head thereon and a pair of angularly related flats on the head of the female section to oppose and slidably engage the flats on the male section when the sections are engaged.

8. A combination fluid and electrical quick disconnect coupling of the character referred to including, a male section having an elongate tubular body with inner and outer ends, an elongate tubular hose-engaging nipple concentric with and extending from the outer end of the body, an elongate tubular male member concentric with and extending longitudinally from the inner end of the body and a laterally projecting head on the body having a flat, axially disposed inner face and an opening extending longitudinally therethrough, a female section having an elongate tubular body with inner and outer ends, an elongate tubular hose-engaging nipple concentric with and extending from the outer end of the body and a laterally projecting head having a flat, axially disposed inner face and an opening extending longitudinally therethrough, said male and female sections arranged in axial alignment with their inner ends opposed to each other and with the male member engaged in the body of the female section and with the inner faces on the heads abutting each other, manually operable locking means releasably securing the sections together and including, radially shiftable members carried by the body of the female section and engaged with the male member and a longitudinally shiftable actuating sleeve surrounding the body of the female section longitudinally outwardly of the head thereof and operatively related to the said shiftable members to normally maintain them in engagement with the male member and operable to allow for free shifting of said members from engagement with said male member, an electrical coupler including carriers of dielectric material in the openings in the heads, inwardly opening socket elements carried by one carrier and connected with lines of a section of an electrical loom at the rear of the head, inwardly projecting jack elements carried by the other carrier to register with and slidably enter the socket elements in the first mentioned carrier and connected with the lines of another section of the electrical loom, and orienting means including a longitudinally inwardly projecting pin on one section engaged in a longitudinally inwardly disposed opening in the other section.

References Cited in the file of this patent

UNITED STATES PATENTS

| | | |
|---|---|---|
| 296,547 | Flad | Apr. 8, 1884 |
| 1,921,447 | Barnett | Aug. 8, 1933 |
| 2,067,796 | Smith | Jan. 12, 1937 |
| 2,291,071 | Bruno | July 28, 1942 |
| 2,510,125 | Meakin | June 6, 1950 |
| 2,631,185 | Earle et al. | Mar. 10, 1953 |
| 2,634,311 | Darling | Apr. 7, 1953 |
| 2,654,077 | McLoad | Sept. 29, 1953 |
| 2,708,589 | Masek | May 17, 1955 |
| 2,825,882 | Mitchell | Mar. 4, 1958 |
| 2,865,978 | Modrey | Dec. 23, 1958 |
| 2,877,435 | Alvine | Mar. 10, 1959 |
| 2,877,437 | Flanagan | Mar. 10, 1959 |
| 2,933,712 | Klopfenstein | Apr. 19, 1960 |

FOREIGN PATENTS

| | | |
|---|---|---|
| 547,618 | Great Britain | Sept. 3, 1942 |